(12) United States Patent
Nishioka et al.

(10) Patent No.: US 7,253,235 B2
(45) Date of Patent: Aug. 7, 2007

(54) RUBBER COMPOSITION FOR A TIRE AND TIRE USING THE SAME

(75) Inventors: Kazuyuki Nishioka, Kobe (JP); Takahiro Mabuchi, Kobe (JP); Katsumi Terakawa, Kobe (JP); Kiyoshige Muraoka, Kobe (JP)

(73) Assignee: Sumitomo Rubber Industries, Ltd., Kobe-Shi, Hyogo-Ken (JP)

( * ) Notice: Subject to any disclaimer, the term of this patent is extended or adjusted under 35 U.S.C. 154(b) by 0 days.

(21) Appl. No.: 10/960,273

(22) Filed: Oct. 8, 2004

(65) Prior Publication Data

US 2005/0119399 A1    Jun. 2, 2005

(30) Foreign Application Priority Data

| Nov. 28, 2003 | (JP) | ............................. 2003-399317 |
| Feb. 9, 2004 | (JP) | ............................. 2004-032136 |
| Feb. 12, 2004 | (JP) | ............................. 2004-034797 |
| Mar. 31, 2004 | (JP) | ............................. 2004-105483 |
| Aug. 17, 2004 | (JP) | ............................. 2004-237206 |

(51) Int. Cl.
*C08F 8/04* (2006.01)

(52) U.S. Cl. ....................... 525/241; 525/236; 525/237; 152/209.1

(58) Field of Classification Search ................ 525/236, 525/237, 241; 152/209.1
See application file for complete search history.

(56) References Cited

U.S. PATENT DOCUMENTS 3,798,190 A * 3/1974 Yoshimoto et al. ......... 525/237
5,034,465 A * 7/1991 Yagi et al. .................. 525/236

FOREIGN PATENT DOCUMENTS

| EP | 0 087 736 A1 | 9/1983 |
| EP | 0 644 235 A1 | 3/1995 |
| EP | 0 751 181 A2 | 1/1997 |
| EP | 0 775 725 A1 | 5/1997 |
| EP | 0 891 993 A1 | 1/1999 |
| EP | 1 035 164 A1 | 9/2000 |
| EP | 1 225 200 A2 | 7/2002 |
| EP | 1 514 901 A1 * | 3/2005 |
| JP | 03-052902 * | 3/1991 |
| JP | 03-263443 * | 11/1991 |
| WO | WO 2004/000931 * | 12/2003 |
| WO | WO-2004/000931 A1 | 12/2003 |
| WO | WO-2004/011545 A1 | 2/2004 |

OTHER PUBLICATIONS

JP-A-63-101440 Abstract Only.
JP-A-2003-253051 Abstract Only.
JP-A-2000-129037 Abstract Only.
JP-A-4-227648 Abstract Only.
JP-A-2000-204198 Abstract Only.
JP-A-2003-292672 Abstract Only.
JP-A-2003-089731 Abstract Only.
JP-A-10-28-1997 Abstract Only.
JP-A-4-277537 Abstract Only.
JP-A-9-143388 Abstract Only.
JP-A-10-053671 Abstract Only.
JP-A-9-241428 Abstract Only.
JP-A-2000-273245 Abstract Only.

\* cited by examiner

*Primary Examiner*—Robert D. Harlan
(74) *Attorney, Agent, or Firm*—Birch, Stewart, Kolasch & Birch, LLP

(57) ABSTRACT

The present invention provides a rubber composition for a tire, in which gripping performance and abrasion resistance are improved in a balanced manner, and a tire using the same. Specifically, the present invention provides a rubber composition for a tire comprising 5 to 200 parts by weight of a low molecular weight aromatic vinyl-conjugated diene copolymer having a specific aromatic vinyl content and weight average molecular weight, based on 100 parts by weight of a rubber component containing aromatic vinyl-conjugated diene copolymer, a rubber composition for a tire comprising 5 to 200 parts by weight of an olefin-conjugated diene-aromatic vinyl copolymer based on 100 parts by weight of a diene rubber component, and a tire using the same.

11 Claims, No Drawings

RUBBER COMPOSITION FOR A TIRE AND TIRE USING THE SAME

This Nonprovisional application claims priority under 35 U.S.C. § 119(a) on Patent Application No(s). 2003-399317; 2004-32136; 2004-34797; 2004-105483 & 2004-237206 filed in Japan on Nov. 28, 2003; Feb. 9, 2004; Feb. 12, 2004; Mar. 31, 2004 & Aug. 17, 2004; respectively, the entire contents of which are hereby incorporated by reference.

BACKGROUND OF THE INVENTION

The present invention relates to a rubber composition for a tire and a tire using the same.

In tread rubber of high performance tires such as racing tires, usually both high gripping performance and abrasion resistance are required.

Conventionally, as rubber compositions for a tire having high gripping performance, known are a rubber composition containing styrene-butadiene copolymer rubber (SBR) having a high glass transition temperature (Tg) as the rubber component; a rubber composition in which process oil is substituted with an equivalent amount of resin having a high softening point which is added to the rubber component; a rubber composition in which a large amount of a softening agent or carbon black is added; and a rubber composition in which a combination of SBR, resin having a high softening point and a softening agent or carbon black is compounded. However, a rubber composition in which SBR having high Tg is used has the problem that temperature dependency is large and the influence of temperature change on performance becomes large. Furthermore, in the case that carbon black having small particle size or a large amount of a softening agent is used, dispersability of carbon black is poor and abrasion resistance decreases.

In order to solve the above problems, a rubber composition containing low molecular weight styrene-butadiene copolymer has been suggested (see JP-A-63-101440). However, because low molecular weight styrene-butadiene copolymer has crosslinkable double bonds, part of the low molecular weight component crosslinks with the matrix rubber component and is introduced into the matrix. As a result, there is the problem that hysteresis loss cannot sufficiently be suppressed. Also, in the case that double bonds are made into saturated bonds by hydrogenation in order to prevent the low molecular weight component from being introduced into the matrix by crosslinking, compatibility with the matrix decreases significantly. Consequently, problems occur such as decrease in destruction resistance properties and bleeding of the low molecular weight component.

Also, in order to improve gripping performance on wet road surfaces (wet grip performance), a rubber composition containing halogenated butyl rubber or halogenide of a copolymer of isobutylene and p-methylstyrene and silica has been suggested (see JP-A-2000-204198). However, the balance of gripping performance and abrasion resistance is insufficient.

In the same way, in order to improve wet grip performance, a rubber composition containing hydrogenated SBR and silica is suggested (see WO 96/05250). However, wet grip performance cannot sufficiently be improved.

Furthermore, a rubber composition containing liquid polybutadiene has been suggested (JP-A-2000-273245). However, although gripping performance improves, abrasion resistance decreases.

SUMMARY OF THE INVENTION

The present inventions aims to provide rubber composition for a tire in which gripping performance and abrasion resistance are improved in a balanced manner and a tire using the same.

The first embodiment of the present invention relates to a rubber composition for a tire comprising 5 to 200 parts by weight of a low molecular weight aromatic vinyl-conjugated diene copolymer having aromatic vinyl content of 10 to 70% by weight and weight average molecular weight of $2.0 \times 10^3$ to $5.0 \times 10^4$, 2 to 50 parts by weight of a resin having a softening point of 50 to 150° C., and 1 to 10 parts by weight of a softening agent and/or a plasticizer, based on 100 parts by weight of a rubber component containing at least 60% by weight of an aromatic vinyl-conjugated diene copolymer having aromatic vinyl content of 20 to 60% by weight.

The second embodiment of the present invention relates to a rubber composition for a tire comprising 5 to 200 parts by weight of a low molecular weight aromatic vinyl-conjugated diene copolymer (B) based on 100 parts by weight of a rubber component containing an aromatic vinyl-conjugated diene copolymer (A); wherein said aromatic vinyl-conjugated diene copolymer (A) has weight average molecular weight of $5.0 \times 10^5$ to $2.5 \times 10^6$ and aromatic vinyl content of 10 to 60% by weight, and said low molecular weight aromatic vinyl-conjugated diene copolymer (B) is obtained by hydrogenating or epoxidizing low molecular weight aromatic vinyl-conjugated diene copolymer, in which the amount of vinyl bonds in the conjugated diene part is 20 to 70%, and has weight average molecular weight of $1.0 \times 10^3$ to $1.0 \times 10^5$, aromatic vinyl content of 10 to 75% by weight and hydrogenation ratio of 20 to 60% or epoxidization ratio of 3 to 60%.

Furthermore, the rubber composition for a tire of the second embodiment of the present invention preferably further comprises halogenated butyl rubber or a halogenide of a copolymer of isobutylene and p-methylstyrene as a rubber component.

The amount of vinyl bonds in the conjugated diene part of said aromatic vinyl-conjugated diene copolymer (A) is preferably 15 to 70%.

The aromatic vinyl content of said aromatic vinyl-conjugated diene copolymer (A) and the aromatic vinyl content of said low molecular weight aromatic vinyl-conjugated diene copolymer (B) preferably satisfy the following equation:

aromatic vinyl content of copolymer (B)>aromatic vinyl content of copolymer (A)

The third embodiment of the present invention relates to a rubber composition for a tire comprising 5 to 200 parts by weight of an olefin-conjugated diene-aromatic vinyl copolymer, based on 100 parts by weight of a diene rubber component.

The weight average molecular weight of the olefin-conjugated diene-aromatic vinyl copolymer is preferably 2000 to 50000.

Also, the present invention relates to tires comprising the rubber compositions for a tire of the first, second and third embodiments of the present invention.

DETAILED DESCRIPTION

The rubber composition for a tire of the first embodiment of the present invention comprises a rubber component, a low molecular weight aromatic vinyl-conjugated diene copolymer, a resin and a softening agent and/or a plasticizer.

The rubber component comprises an aromatic vinyl-conjugated diene copolymer having aromatic vinyl content of 20 to 60% by weight. The upper limit of the aromatic vinyl content is preferably 50% by weight. When the aromatic vinyl content is less than 20% by weight, sufficient gripping performance cannot be obtained. When the aromatic vinyl content is more than 60% by weight, not only does abrasion resistance decrease but also temperature dependency increases and as a result, the influence of temperature change on performance becomes large.

Herein, examples of the aromatic vinyl component in the above aromatic vinyl-conjugated diene copolymer are vinyl aromatic hydrocarbon monomers such as styrene, α-methylstyrene, 1-vinyl naphthalene, 3-vinyl toluene, ethyl vinyl benzene, divinyl benzene, 4-cyclohexyl styrene and 2,4-trimethyl styrene. These can be used alone or two or more can be used together. Of these, styrene is preferable. Examples of the conjugated diene component are 1,3-butadiene, isoprene, 1,3-pentadiene, 2,3-dimethylbutadiene and 2-phenyl-1,3-butadiene. These can be used alone or two or more kinds can be used together. Of these, 1,3-butadiene is preferable.

The content of the aromatic vinyl-conjugated diene copolymer in the rubber component is at least 60% by weight, preferably at least 70% by weight, more preferably at least 80% by weight. When the content is less than 60% by weight, gripping performance decreases. Also, the content is preferably at most 100% by weight, more preferably at most 90% by weight.

The rubber component can contain a rubber component other than the above aromatic vinyl-conjugated diene rubber copolymer. Examples of the other rubber component are cis-1,4-polyisoprene, low cis-1,4-polybutadiene, high cis-1,4-polybutadiene, ethylene-propylene-diene rubber, chloroprene, halogenated butyl rubber, acrylonitrile-butadiene rubber and natural rubber, but are not limited thereto. Also, an aromatic vinyl-conjugated diene rubber having aromatic vinyl content outside the above range can be used as the other rubber component. One or at least two kinds of the above other rubber components can be included in the rubber component of the present invention.

The weight average molecular weight (Mw) of the low molecular weight aromatic vinyl-conjugated diene copolymer in the first embodiment of the present invention is at least $2.0 \times 10^3$, preferably at least $2.5 \times 10^3$, more preferably at least $3.0 \times 10^3$. When the weight average molecular weight is less than $2.0 \times 10^3$, abrasion resistance tends to decrease. Also, the weight average molecular weight is at most $5.0 \times 10^4$, preferably at most $4.0 \times 10^4$, more preferably at most $3.0 \times 10^4$. When the weight average molecular weight is more than $5.0 \times 10^4$, particularly, gripping performance in low temperatures decreases.

Herein, examples of the aromatic vinyl component in the low molecular weight aromatic vinyl-conjugated diene copolymer are vinyl aromatic hydrocarbon monomers such as styrene, α-methylstyrene, 1-vinyl naphthalene, 3-vinyl toluene, ethyl vinyl benzene, divinyl benzene, 4-cyclohexyl styrene and 2,4-trimethyl styrene. These can be used alone or two or more can be used together. Of these, styrene is preferable. Examples of the conjugated diene component are 1,3-butadiene, isoprene, 1,3-pentadiene, 2,3-dimethylbutadiene and 2-phenyl-1,3-butadiene. These can be used alone or two or more kinds can be used together. Of these, 1,3-butadiene is preferable.

The aromatic vinyl content of the low molecular weight aromatic vinyl-conjugated diene copolymer is at least 10% by weight, preferably at least 20% by weight. When the aromatic vinyl content is less than 10% by weight, sufficient abrasion resistance cannot be obtained. Also, the aromatic vinyl content is at most 70% by weight, preferably at most 60% by weight. When the content is more than 70% by weight, not only does gripping performance decrease but also temperature dependency increases and as a result, the influence of temperature change on performance increases.

The content of the low molecular weight aromatic vinyl-conjugated diene copolymer is at least 5 parts by weight, preferably at least 10 parts by weight, more preferably at least 20 parts by weight, based on 100 parts by weight of the rubber component. When the content is less than 5 parts by weight, gripping performance decreases. Also, the content is at most 200 parts by weight, preferably at most 180 parts by weight, more preferably at most 150 parts by weight. When the content is more than 200 parts by weight, abrasion resistance decreases.

Examples of the resin in the first embodiment of the present invention are petroleum resin and a tackifier.

Examples of the resin are Hi-rez (trade name, available from Mitsui Petrochemical Industries, Ltd.), Escorez (available from Exxon Chemical Company), TACKROL® (available from Sumitomo Chemical Co., Ltd.), ARKON (available from Arakawa Chemical Industries, Ltd.), Harimack (available from Harima Chemicals, Inc.), ESTER GUM (available from Arakawa Chemical Industries, Ltd.), PENSEL (available from Arakawa Chemical Industries, Ltd.), LIMED RESIN (available from Arakawa Chemical Industries, Ltd.), SUPER ESTER (available from Arakawa Chemical Industries, Ltd.), High-Rosin (available from Yasuhara Chemical Co., Ltd.), MR resin (available from Yasuhara Chemical Co., Ltd.), YS resin (available from Yasuhara Chemical Co., Ltd.), Neopolymer (available from Nippon Petrochemicals Company, Limited), Wingtack® (available from Goodyear Chemical Company), Quintone (available from Zeon Corporation), Lignol (available from Lignyte Co., Ltd.), Nikanol (available from Mitsubishi Gas Chemical Co., Inc.), YS Polyster (available from Yasuhara Chemical Co., Ltd.), Hitanol (available from Hitachi Chemical Co., Ltd.), Sumilite® (available from Sumitomo Dures), ESCURON (available from Nippon Steel Chemical Group), TAMANOL (available from Arakawa Chemical Industries, Ltd.), and Process Resin (available from Kobe Oil Chemical Industrial Co., Ltd.), but are not limited thereto. These may be used alone or two or more kinds may be used together.

The softening point of the resin is at least 50° C., preferably at least 60° C., more preferably at least 70° C. When the softening point is lower than 50° C., abrasion resistance decreases. Also, the softening point is at most 150° C., preferably at most 140° C., more preferably at most 130° C. When the softening point is higher than 150° C., gripping performance decreases.

The content of the resin is at least 2 parts by weight, preferably at least 5 parts by weight, more preferably at least 10 parts by weight, based on 100 parts by weight of the rubber component. When the content is less than 2 parts by weight, the effect of improving gripping performance is small. Also, the content of the resin is at most 50 parts by weight, preferably at most 40 parts by weight, more preferably at most 30 parts by weight. When the content is more than 50 parts by weight, temperature dependency increases and the influence of temperature change on performance increases.

The softening agent and/or plasticizer in the first embodiment of the present invention can be those that are usually used in the rubber industry. Examples of the softening agent are a petroleum softening agent, a coal tar softening agent and a fatty oil softening agent. An example of the plasticizer is an ester plasticizer.

The content of the softening agent and/or plasticizer is at least 1 part by weight based on 100 parts by weight of the rubber component. The rubber composition for a tire of the first embodiment of the present invention can be improved highly in abrasion resistance and gripping performance in a balanced manner, only when the rubber component, the low molecular weight aromatic vinyl-conjugated diene copolymer and resin, along with the softening agent and/or plasticizer, are all contained in a specific amount. When the content of the softening agent and/or plasticizer is less than 1 part by weight, abrasion resistance and gripping performance cannot be highly improved in a balanced manner. Also, the content is at most 10 parts by weight, preferably at most 5 parts by weight. When the content is more than 10 parts by weight, abrasion resistance decreases.

The rubber composition for a tire of the first embodiment of the present invention preferably further contains a reinforcing filler. As the reinforcing filler, any filler that is normally used in the conventional rubber composition for a tire can be used, but mostly, carbon black is preferable. The reinforcing filler can be used alone or two or more kinds can be used together.

The content of carbon black is preferably at least 10 parts by weight, more preferably at least 20 parts by weight, based on 100 parts by weight of the rubber component. When the amount of carbon black is less than 10 parts by weight, abrasion resistance tends to decrease. Also, the content of carbon black is preferably at most 200 parts by weight, more preferably at most 150 parts by weight. When the content is more than 200 parts by weight, processability tends to decrease.

The nitrogen-adsorbing specific surface area of the carbon black is preferably at least 80 $m^2/g$, more preferably at least 100 $m^2/g$. When nitrogen-adsorbing specific surface area of the carbon black is less than 80 $m^2/g$, both gripping performance and abrasion resistance tend to decrease. Also, nitrogen-adsorbing specific surface area of the carbon black is preferably at most 280 $m^2/g$, more preferably at most 200 $m^2/g$. When nitrogen-adsorbing specific surface area of the carbon black is more than 280 $m^2/g$, dispersability cannot sufficiently be obtained and abrasion resistance tends to decrease.

Furthermore, besides the above components, the rubber composition for a tire of the first embodiment of the present invention can contain various chemicals that are usually used in the rubber industry, for example additives such as a vulcanizing agent including sulfur, a vulcanization accelerator, a softening agent, an antioxidant, stearic acid and an antiozonant.

The rubber composition for a tire of the second embodiment of the present invention comprises a rubber component containing aromatic-vinyl conjugated diene copolymer (A) and a low molecular weight aromatic vinyl-conjugated diene copolymer (B).

Component (A) (hereinafter referred to as copolymer (A)) comprises a copolymer of an aromatic vinyl compound and a conjugated diene compound. Herein, examples of the aromatic vinyl component in copolymer (A) are vinyl aromatic hydrocarbon monomers such as styrene, α-methylstyrene, 1-vinyl naphthalene, 3-vinyl toluene, ethyl vinyl benzene, divinyl benzene, 4-cyclohexyl styrene and 2,4-trimethyl styrene. These can be used alone or two or more can be used together. Of these, styrene is preferable.

Examples of the conjugated diene component are 1,3-butadiene, isoprene, 1,3-pentadiene, 2,3-dimethylbutadiene and 2-phenyl-1,3-butadiene. These can be used alone or two or more kinds can be used together. Of these, 1,3-butadiene is preferable.

Copolymer (A) is preferably obtained by solution polymerization of the conjugated diene compound and the aromatic vinyl compound. By solution polymerization, the effect of easily controlling the amount of vinyl bonds in the conjugated diene part and molecular weight distribution can be obtained.

The weight average molecular weight of copolymer (A) is at least $5.0 \times 10^5$, preferably at least $7.5 \times 10^5$. When the weight average molecular weight is less than $5.0 \times 10^5$, abrasion resistance decreases. Also, the weight average molecular weight is at most $2.5 \times 10^6$, preferably $2.0 \times 10^6$. When the weight average molecular weight is more than $2.5 \times 10^6$, processability decreases.

The aromatic vinyl content of copolymer (A) is at least 10% by weight, preferably at least 20% by weight. When the aromatic vinyl content is less than 10% by weight, wet grip performance is low. Also, the aromatic vinyl content of copolymer (A) is at most 60% by weight, preferably at most 50% by weight. When the aromatic vinyl content is more than 60% by weight, abrasion resistance and wet grip performance in low temperatures decrease.

The glass transition temperature of copolymer (A) is preferably at least −70° C., more preferably at least −50° C. When the glass transition temperature is lower than −70° C., wet grip performance is poor. Also, the glass transition temperature is preferably at most 0° C. When the glass transition temperature is higher than 0° C., the rubber becomes excessively hard and tends to become brittle in low temperatures.

The amount of vinyl bonds in the conjugated diene part of copolymer (A) is preferably at least 15%, more preferably at least 20%, further preferably at least 30%. When the amount of vinyl bonds is less than 15%, wet grip performance tends to be low. Also, the amount of vinyl bonds is preferably at most 70%, more preferably at most 60%, further preferably at most 50%. When the amount of vinyl bonds is more than 70%, abrasion resistance decreases and wet grip performance in low temperatures tends to decrease.

The content of copolymer (A) in the rubber component is preferably at least 40% by weight, more preferably at least 45% by weight, further preferably at least 60% by weight, particularly preferably at least 80% by weight. When the content is less than 40% by weight, sufficient gripping performance may not be obtained.

The rubber component in the second embodiment of the present invention can also contain a halogenated butyl rubber (hereinafter referred to as X-IIR) or a halogenide of a copolymer of isobutylene and p-methylstyrene (hereinafter referred to as X-IB-PMS). These can be used alone or together. Of these, X-IB-PMS is preferably used, from the viewpoints that co-crosslinkability with other diene rubber is excellent and wet grip performance and abrasion resistance can be improved further.

X-IIR can be halogenated butyl rubber that is usually used in rubber compositions and is not particularly limited. However, the halogen content is preferably 1.1 to 1.3% in chlorinated butyl rubber and 1.8 to 2.4% in brominated butyl rubber. Also, from the viewpoint of processability, the Mooney viscosity at 125° C. is preferably 20 to 60, more preferably 25 to 55. Preferable examples are Chlorobutyl 1066, Chlorobutyl 1068, Bromobutyl 2244 and Bromobutyl 2255 available from JSR Corporation and Exxon Chemical Company.

The X-IB-PMS preferably has weight ratio of isobutylene monomer/p-methylstyrene monomer of 90/10 to 98/2 and halogen content of 5 to 7%, from the viewpoint of co-crosslinkability. Preferable examples are Exxpro 90-10 (trade name) available from Exxon Chemical Company.

The content of X-IIR or X-IB-PMS in the rubber component is preferably 20 to 60% by weight, more preferably 30 to 50% by weight, from the viewpoint that the effect of improving abrasion resistance and wet grip performance is excellent.

When X-IIR or X-IB-PMS is included in the rubber component, the content of copolymer (A) in the rubber component is preferably 40 to 80% by weight, more preferably 50 to 70% by weight, from the viewpoint that the effect of improving abrasion resistance and wet grip performance are excellent.

Besides the above, as the rubber component, polyisoprene rubber (IR), polybutadiene rubber (BR), ethylene-propylene-diene rubber, chloroprene rubber (CR), butyl rubber (IIR), acrylonitrile-butadiene rubber and natural rubber can be used together with copolymer (A). Also, styrene-butadiene rubber (SBR) that does not satisfy the weight average molecular weight or aromatic vinyl content of copolymer (A) can also be used together with copolymer (A).

Examples of the aromatic vinyl component in low molecular weight aromatic vinyl-conjugated diene copolymer (B) (hereinafter referred to as copolymer (B)) are vinyl aromatic hydrocarbon monomers such as styrene, α-methylstyrene, 1-vinyl naphthalene, 3-vinyl toluene, ethyl vinyl benzene, divinyl benzene, 4-cyclohexyl styrene and 2,4-trimethyl styrene. These can be used alone or two or more can be used together. Of these, styrene is preferable.

Examples of the conjugated diene component in copolymer (B) are 1,3-butadiene, isoprene, 1,3-pentadiene, 2,3-dimethylbutadiene and 2-phenyl-1,3-butadiene. These can be used alone or two or more kinds can be used together. Of these, 1,3-butadiene is preferable.

Copolymer (B) is preferably obtained by solution polymerization of the conjugated diene compound and the aromatic vinyl compound. By solution polymerization, the effects of easily controlling the amount of vinyl bonds in the conjugated diene part and controlling molecular weight distribution can be obtained.

Copolymer (B) is obtained by hydrogenating or epoxidizing a copolymer in which the amount of vinyl bonds in the conjugated diene part is at least 20%, preferably at least 30%. When the amount of vinyl bonds is less than 20%, wet grip performance cannot sufficiently be obtained. Also, copolymer (B) is obtained by hydrogenating or epoxidizing a copolymer in which the amount of vinyl bonds in the conjugated diene part is at most 70%. When the amount of vinyl bonds is more than 70%, abrasion resistance decreases.

The weight average molecular weight of copolymer (B) is at least $1.0 \times 10^3$, preferably at least $2.0 \times 10^3$. When the weight average molecular weight is less than $1.0 \times 10^3$, abrasion resistance is insufficient. Also, the weight average molecular weight is at most $1.0 \times 10^5$, preferably $8.0 \times 10^4$. When the weight average molecular weight is more than $1.0 \times 10^5$, wet grip performance cannot sufficiently be obtained.

The aromatic vinyl content of copolymer (B) is at least 10% by weight, preferably at least 20% by weight. When the aromatic vinyl content is less than 10% by weight, wet grip performance cannot sufficiently be obtained. Also, the aromatic vinyl content of copolymer (B) is at most 75% by weight, preferably at most 50% by weight. When the aromatic vinyl content is more than 75% by weight, abrasion resistance decreases.

The hydrogenation ratio of double bonds in the conjugated diene part of copolymer (B) is at least 20%, preferably at least 30%, more preferably at least 40%, further preferably at least 43%, particularly preferably at least 45%. When the hydrogenation ratio is lower than 20%, wet grip performance cannot sufficiently be obtained, as copolymer (B) is introduced into the matrix rubber component. Also, the hydrogenation ratio is at most 60%, preferably at most 55%, more preferably at most 50%. When the hydrogenation ratio is higher than 60%, the rubber composition becomes hard, wet grip performance and abrasion resistance cannot sufficiently be obtained and bleeding tends to occur.

The epoxidization ratio of copolymer (B) is at least 3%, preferably at least 5%. When the epoxidization ratio is less than 3%, the dispersability of the silica that is used as a reinforcing filler in the rubber composition cannot be improved and sufficient gripping performance and abrasion resistance cannot be obtained. Also, the epoxidization ratio is at most 60%, preferably at most 50%. When the epoxidization ratio is more than 60%, compatibility with the rubber component becomes poor and gripping performance and durability tends to decrease.

The content of copolymer (B) is at least 5 parts by weight, preferably at least 10 parts by weight, more preferably at least 15 parts by weight, further preferably at least 20 parts by weight, based on 100 parts by weight of the rubber component. When the content is less than 5 parts by weight, gripping performance cannot sufficiently be obtained. Also, the content is at most 200 parts by weight, preferably at most 180 parts by weight, more preferably at least 150 parts by weight. When the content is at most 200 parts by weight, not only processability but also abrasion resistance decrease.

When the rubber component contains X-IIR or X-IB-PMS, the content of copolymer (B) is preferably at least 5 parts by weight, more preferably at least 15 parts by weight, further preferably at least 20 parts by weight based on 100 parts by weight of the rubber component. When the content is less than 5 parts by weight, wet grip performance may not sufficiently be obtained. Also, the content is preferably at most 100 parts by weight, more preferably at most 70 parts by weight, further preferably at most 40 parts by weight. When the content is more than 100 parts by weight, not only processability but also abrasion resistance tend to decrease.

The aromatic vinyl content of aromatic vinyl-conjugated diene copolymer (A) and the aromatic vinyl content of low molecular weight aromatic vinyl-conjugated diene copolymer (B) preferably satisfy the following equation:

$$\text{aromatic vinyl content of copolymer (B)} > \text{aromatic vinyl content of copolymer (A)}.$$

When the aromatic vinyl content of copolymer (B) is less than the aromatic vinyl content of aromatic vinyl copolymer (A), compatibility is poor and bleeding tends to occur.

The rubber composition for a tire of the second embodiment of the present invention preferably further contains a reinforcing filler. As the reinforcing filler, any filler that is normally used in the conventional rubber composition for a tire can be used, and carbon black and silica are particularly preferable.

The nitrogen-adsorbing specific surface area ($N_2SA$) of the carbon black is preferably at least 80 $m^2/g$, more preferably at least 100 $m^2/g$. When $N_2SA$ of the carbon black is less than 80 m²/g, both gripping performance and abrasion resistance tend to be poor. Also, N₂SA of the carbon black is preferably at most 280 m²/g, more preferably at most 200 m²/g. When N₂SA of the carbon black is more than 280 m²/g, dispersability cannot sufficiently be obtained and abrasion resistance tends to decrease.

The content of carbon black is preferably at least 10 parts by weight, more preferably at least 20 parts by weight, based on 100 parts by weight of the rubber component. When the content of carbon black is less than 10 parts by weight, abrasion resistance tends to decrease. Also, the content of carbon black is preferably at most 200 parts by weight, more preferably at most 150 parts by weight. When the content is more than 200 parts by weight, processability tends to decrease.

The silica preferably has nitrogen-adsorbing specific surface area (N₂SA) of 100 to 300 m²/g, from the viewpoint of providing the effect of improving wet grip performance, preventing degradation of dispersability and suppressing heat generation, and more preferably has N₂SA of 100 to 250 m²/g, when abrasion resistance (strength) is also considered. When N₂SA is less than 100 m²/g, the effect of improving wet grip performance is low and when N₂SA is more than 300 m²/g, dispersability is poor and heat generation tends to increase.

Examples of the silica are dry silica (silicic anhydride) and wet silica (silicic hydrate), which satisfy the above requirements. Preferable examples are Nipsil VN3 and Nipsil AQ available from Nippon Silica Co., Ltd. and Ultrasil VN3 available from Degussa Co.

The content of silica is preferably at least 40 parts by weight, more preferably at least 50 parts by weight, based on 100 parts by weight of the rubber component. When the content of silica is less than 40 parts by weight, rolling resistance is not reduced and wet skid performance may not be improved. Also, the content of silica is preferably at most 150 parts by weight, more preferably at most 130 parts by weight. When the content of silica is more than 150 parts by weight, kneading becomes difficult, abrasion resistance decreases and rolling resistance tends to increase.

The reinforcing filler can be used alone or two or more kinds can be used together.

Furthermore, besides the above components, the rubber composition for a tire of the second embodiment of the present invention can contain various chemicals that are usually used in the rubber industry, for example additives such as a vulcanizing agent including sulfur, a vulcanization accelerator, a softening agent, zinc oxide, an antioxidant, stearic acid and an antiozonant.

The softening agent can be any softening agent that is conventionally used in the field of rubber compositions and is not particularly limtied. Examples are paraffin process oil, naphthene process oil, aromatic process oil and special process oil. These can be used alone or two or more kinds can be used together. Of these, aromatic process oil, naphthene process oil and special process oil are preferable from the viewpoint of achieving both processability and performance.

The amount of the softening agent is preferably at least 10 parts by weight based on 100 parts by weight of the rubber component, from the viewpoint of processability and performance of a rubber composition containing silica. When the amount of the softening agent is less than 10 parts by weight, a large amount of a filler such as silica cannot be compounded. Also, the amount of the softening agent is preferably at most 180 parts by weight, more preferably at most 160 parts by weight. When the amount is more than 180 parts by weight, workability, abrasion resistance and tensile strength tend to decrease.

As the silane coupling agent, any silane coupling agent that is conventionally used together with a silica can be used. Preferable examples are a silane coupling agent represented by formula (1):

Z-Alk-S$_n$-Alk-Z  (1)

(wherein Z is —Si(R¹)₂R², —SiR¹(R²)₂, —Si(R²)₃ (R¹ is an alkyl group having 1 to 4 carbon atoms, a cyclohexyl group or a phenyl group, R² is an alkoxy group having 1 to 8 carbon atoms or a cycloalkoxy group having 5 to 8 carbon atoms; in the case that two or more of R¹ or R² are included, these can be the same or different), Alk is a divalent hydrocarbon group having 1 to 18 carbon atoms, n represents an integer of 2 to 8; the two Z and two Alk may respectively be the same or different) or a silane coupling agent represented by formula (2):

Z-Alk-SH  (2)

(wherein Z and Alk are the same as above). Specific examples are bis(3-triethoxysilylpropyl)tetrasulfide, bis(2-triethoxysilylethyl)tetrasulfide, bis(3-trimethoxysilylpropyl)tetrasulfide, bis(2-trimethoxysilylethyl)tetrasulfide, 3-mercaptopropyltrimethoxysilane, 3-mercaptopropyltriethoxysilane, 2-mercaptoethyltrimethoxysilane, 2-mercaptoethyltriethoxysilane, 3-nitropropyltrimethoxysilane, 3-nitropropyltriethoxysilane, 3-chloropropyltrimethoxysilane, 3-chloropropyltriethoxysilane, 2-chloroethyltrimethoxysilane and 2-chloroethyltriethoxysilane, 3-trimethoxysilylpropyl-N,N-dimethylthiocarbamoyltetrasulfide, 3-triethoxysilylpropyl-N,N-dimethylthiocarbamoyltetrasulfide, 2-triethoxysilylethyl-N,N-dimethylthiocarbamoyltetrasulfide, 3-trimethoxysilylpropylbenzothiazoletetrasulfide, 3-triethoxysilylpropylbenzothiazoletetrasulfide, 3-triethoxysilylpropylmethacrylatemonosulfide and 3-trimethoxysilylpropylmethacrylatemonosulfide. These coupling agents may be used alone or two or more kinds may be used together. Of these, in view of achieving both the effects of adding the coupling agent and low cost, bis(3-triethoxysilylpropyl)tetrasulfide is preferable.

The amount of the silane coupling agent is not particularly limited as long as the effects of the present invention are not lost and is preferably at least 5 parts by weight based on 100 parts by weight of the silica, from the viewpoint of improving performance and processability. When the amount of the silane coupling agent is less than 5 parts by weight, the dipersability of silica is poor and as a result, abrasion resistance decreases and rolling resistance may not be reduced. Also, the amount of the silane coupling agent is preferably at most 20 parts by weight, more preferably at most 10 parts by weight. When the amount is more than 20 parts by weight, the rubber hardness increases and wet grip performance tends to decrease.

The rubber composition for a tire of the third embodiment of the present invention comprises a diene rubber component and an olefin-conjugated diene-aromatic vinyl copolymer.

As the diene rubber component, natural rubber and/or diene synthetic rubber is used. Herein, examples of the synthetic diene rubber are butadiene rubber (BR), styrene butadiene rubber (SBR), isoprene synthetic rubber (IR), acrylonitrile-butadiene rubber (NBR), isobutylene-isoprene rubber (IIR) and chloroprene rubber (CR). These rubbers can be used alone or two or more kinds can be used together.

Of the above diene rubber components, SBR is preferably used from the viewpoint of balance in gripping performance and abrasion resistance. When SBR is used, the glass transition temperature (Tg) of the SBR is preferably at least −50° C. When Tg is lower than −50° C., gripping performance may not be sufficient. Also, Tg is preferably at most 0° C., more preferably at most −10° C. When Tg is higher than 0° C., gripping performance in low temperatures tend to decrease.

Examples of the olefin monomer component in the olefin-conjugated diene-aromatic vinyl copolymer are olefins such as ethylene, propylene, 1-butene, 2-butene, isobutene, 1-hexene, 1-octene, 1-heptene and 1-decene. These can be used alone or two or more kinds can be used together. Of these, from the viewpoints of versatility, economic efficiency and reactivity, ethylene is preferable.

The ratio of olefin monomer units is preferably at least 5% by weight, more preferably at least 10% by weight. When the ratio of monomer units is less than 5% by weight, crosslinking is inhibited during vulcanization and as a result, abrasion resistance tends to decrease. Also, the ratio of olefin monomer units is preferably at most 80% by weight, more preferably at most 70% by weight. When the ratio of olefin monomer units is more than 80% by weight, compatibility of the matrix rubber component and the olefin-conjugated diene-aromatic vinyl copolymer becomes poor and bleeding tends to occur.

Examples of the conjugated diene monomer component are 1,3-butadiene, isoprene, 1,3-pentadiene, 2,3-dimethylbutadiene and 2-phenyl-1,3-butadiene. These can be used alone or two or more kinds can be used together. Of these, from the viewpoints of versatility, economic efficiency and reactivity, 1,3-butadiene is preferable.

The ratio of conjugated diene monomer units is preferably at least 5% by weight, more preferably at least 10% by weight. When the ratio of monomer units is less than 5% by weight, compatibility of the matrix rubber component and the olefin-conjugated diene-aromatic vinyl copolymer becomes poor and bleeding tends to occur. Also, the ratio of conjugated diene monomer units is preferably at most 80% by weight, more preferably at most 70% by weight. When the ratio of monomer units is more than 80% by weight, crosslinking is inhibited during vulcanization and as a result, abrasion resistance tends to decrease.

Examples of the aromatic vinyl monomer component are vinyl aromatic hydrocarbon monomers such as styrene, α-methylstyrene, 1-vinyl naphthalene, 3-vinyl toluene, ethyl vinyl benzene, divinyl benzene, 4-cyclohexyl styrene and 2,4,6-trimethyl styrene. These can be used alone or two or more can be used together. Of these, from the viewpoints of versatility, economic efficiency and reactivity, styrene is preferable.

The ratio of aromatic vinyl monomer units is preferably at least 5% by weight, more preferably at least 10% by weight. When the ratio of monomer units is less than 5% by weight, the effect of improving gripping performance tends to be small. Also, the ratio of aromatic vinyl monomer units is preferably at most 70% by weight, more preferably at most 60% by weight. When the ratio of monomer units is more than 70% by weight, the effect of improving gripping performance in low temperatures tends to be small.

Examples of combinations of the above monomers are ethylene-butadiene-styrene, propylene-butadiene-styrene, propylene-isoprene-styrene and ethylene-isoprene-styrene. Particularly, from the viewpoints of versatility, economic efficiency and reactivity, ethylene-butadiene-styrene preferably used.

The configuration of the monomers can be either block or random, but is preferably random, from the viewpoint of balance in gripping performance and abrasion resistance.

The weight average molecular weight (Mw) of the olefin-conjugated diene-aromatic vinyl copolymer is preferably at least 2000, more preferably at least 3000, particularly preferably at least 4000. When Mw is less than 2000, abrasion resistance may not sufficiently be obtained. Also, Mw is preferably at most 50000, more preferably at most 40000, particularly preferably at most 30000. When Mw is more than 50000, gripping performance decreases.

The molecular weight distribution (Mw/Mn) of the olefin-conjugated diene-aromatic vinyl copolymer is preferably at most 2. When the molecular weight distribution is more than 2, durability such as abrasion resistance and heat resistance tends to decrease.

The content of the olefin-conjugated diene-aromatic vinyl copolymer is at least 5 parts by weight, preferably at least 10 parts by weight more preferably at least 15 parts by weight, based on 100 parts by weight of the above diene rubber component. When the content is less than 5 parts by weight, the effect of improving gripping performance is small. Also, the content of the copolymer is at most 200 parts by weight, preferably at most 180 parts by weight, more preferably at most 150 parts by weight. When the content is more than 200 parts by weight, abrasion resistance decreases.

The rubber composition for a tire of the third embodiment of the present invention preferably further contains a reinforcing filler. As the reinforcing filler, any filler that is normally used in the conventional rubber composition for a tire can be used, and carbon black is particularly preferable.

The nitrogen-adsorbing specific surface area ($N_2SA$) of the carbon black is preferably at least 80 $m^2/g$, more preferably at least 100 $m^2/g$. When $N_2SA$ of the carbon black is less than 80 $m^2/g$, both gripping performance and abrasion resistance tend to decrease. Also, $N_2SA$ of the carbon black is preferably at most 280 $m^2/g$, more preferably at most 200 $m^2/g$. When $N_2SA$ of the carbon black is more than 280 $m^2/g$, dispersability cannot sufficiently be obtained and abrasion resistance tends to decrease.

The content of carbon black is preferably at least 10 parts by weight, more preferably at least 20 parts by weight, based on 100 parts by weight of the diene rubber component. When the content of carbon black is less than 10 parts by weight, abrasion resistance tends to decrease. Also, the content of carbon black is preferably at most 200 parts by weight, more preferably at most 150 parts by weight. When the content is more than 200 parts by weight, processability tends to decrease. The reinforcing filler can be used alone or two or more kinds can be used together.

Furthermore, besides the above components, the rubber composition for a tire of the third embodiment of the present invention can contain various chemicals that are usually used in the rubber industry, for example additives such as a vulcanizing agent including sulfur, a vulcanization accelerator, a softening agent, an antioxidant, stearic acid and an antiozonant.

In the case that a softening agent is compounded, the amount of the softening agent is preferably at most 100 parts by weight based on 100 parts by weight of the rubber component. When the amount of the softening agent is more than 100 parts by weight, gripping performance and steering stability tend to decrease.

The tire of the present invention is prepared by the usual method using the rubber compositions for a tire of the first, second and third embodiments of the present invention. That is, the rubber composition for a tire of the present invention, in which the above chemicals are compounded when necessary, is extruded into the shape of each part of a tire before vulcanization and molded by the usual method on a tire forming machine to form an unvulcanized tire. This unvulcanized tire is heated and pressurized in a vulcanizer to obtain a tire. As the tire, a pneumatic tire is particularly preferable. The rubber compositions for a tire of the first, second and third embodiments of the present invention can improve gripping performance and abrasion resistance in a balanced manner even under sever conditions such as a race, particularly when used for the tread among all tire parts.

Hereinafter, the first embodiment of the present invention is explained in more detail based on Examples, but the present invention is not limited thereto.

PREPARATION EXAMPLES 1 TO 4

The synthesis process for low molecular weight styrene-butadiene copolymer is described below.

Preparation Example 1(Synthesis of Low Molecular Weight Styrene-Butadiene Copolymer 1)

A nitrogen-replaced 2 liter autoclave was charged with 1200 g of cyclohexane, 5 g of tetrahydrofuran (THF), 80 g of 1,3-butadiene and 25 g of styrene and the temperature in the autoclave was adjusted to 25° C. Then, 0.05 g of n-butyl lithium was added and polymerization was conducted for 10 minutes while increasing the temperature. Thereafter, 1.5 g of 2,6-di-t-butyl-p-cresol was added as the antioxidant.

Preparation Examples 2 to 4(Synthesis of Low Molecular Weight Styrene-Butadiene Copolymers 2 to 4)

The copolymers were prepared in the same manner as above except that the amounts of the monomers and the catalyst were changed.

The weight average molecular weight of the synthesized copolymers 1 to 4 was measured using a GPC-8000 series machine made by Tosoh Corporation and a differential refractometer as the detector and calibrated by standard polystyrene. The microstructure of the copolymers was found by measuring $^1$H-NMR at 25° C. using a JEOL JNM-A 400 NMR machine and determining the composition of the copolymers from the ratio of phenyl protons based on styrene units at 6.5 to 7.2 ppm and vinyl protons based on butadiene units at 4.9 to 5.4 ppm, calculated from the $^1$H-NMR spectrum. The properties are respectively shown in Table 1.

TABLE 1

| Prep. Ex. No. | 1 | 2 | 3 | 4 |
|---|---|---|---|---|
| Styrene content (% by weight) | 25 | 40 | 5 | 12 |
| Weight average molecular weight | 10000 | 8000 | 14000 | 83000 |

EXAMPLES 1 TO 2 AND COMPARATIVE EXAMPLES 1 TO 6

The various chemicals used in Examples 1 to 2 and Comparative Examples 1 to 6 are described below.

SBR 1: TUFDENE 2100R available from Asahi Chemical Industry Co., Ltd. (styrene content: 25% by weight)

SBR 2: TUFDENE 1000 available from Asahi Chemical Industry Co., Ltd. (styrene content: 18% by weight)

Low molecular weight styrene-butadiene copolymers 1 to 4: low molecular weight styrene-butadiene copolymers synthesized in the above Preparation Examples Carbon black: SHOWBLACK N110 available from Showa Cabot Co. Ltd. ($N_2SA$: 143 $m^2/g$)

Resin 1: ESCOREZ 1202 available from Exxon Chemical Company (softening point: 100° C.)

Resin 2: Struktol TS30 available from S & S Japan Co., Ltd. (softening point: 35° C.)

Resin 3: Neopolymer 150 available from Nippon Petrochemicals Company, Limited (softening point: 155° C.)

Softening agent: Diana Process Oil AH-16 available from Idemitsu Kosan Co., Ltd.

Stearic acid: Stearic acid available from NOF Corporation

Zinc oxide 1: Zinc Oxide type 1 available from Mitsui Mining and Smelting Co., Ltd.

Sulfur: powdery sulfur available from Tsurumi Chemicals Co., Ltd.

Vulcanization accelerator 1: Nocceler CZ available from Ouchi Shinko Chemical Industrial Co., Ltd.

The chemicals were kneaded according to the compositions shown in Table 2 to obtain each sample rubber composition. These compositions were press vulcanized at 170° C. for 20 minutes to obtain vulcanized articles and the following test of properties of the articles were conducted.

(Gripping Performance)

Gripping performance was evaluated using a flat belt-type friction tester (FR 5010 model) made by Ueshima Seisakusho. A cylindrical rubber specimen having width of 20 mm and diameter of 100 mm was obtained from the vulcanized article. The slip ratio of the rubber specimen to the road surface was varied from 0 to 70% under the conditions of speed of 20 km/h, load of 4 kgf and road temperature of 10° C. and 50° C. and the maximum friction coefficient value detected during the test was read. The friction coefficient of each specimen was respectively represented as an index, assuming the friction coefficient of Comparative Example 1 to be 100. The larger the value is the better the gripping performance.

(Abrasion Resistance)

The amount of abrasion was measured under the conditions of room temperature, load of 1.0 kgf and slip ratio of 30% using a Lambourn abrasion tester. The reciprocal of the abrasion amount of each specimen was respectively represented as an index, assuming the abrasion amount of Comparative Example 1 to be 100. The larger the value is the better the abrasion resistance.

The evaluation results are shown in Table 2.

TABLE 2

|  | Ex. | | Com. Ex. | | | | | |
| --- | --- | --- | --- | --- | --- | --- | --- | --- |
|  | 1 | 2 | 1 | 2 | 3 | 4 | 5 | 6 |
| Composition (parts by weight) | | | | | | | | |
| SBR1 | 100 | 100 | 100 | 30 | 100 | 100 | 100 | 100 |
| SBR2 | — | — | — | 70 | — | — | — | — |
| Low molecular weight styrene-butadiene copolymer 1 | 60 | — | — | 60 | — | — | 60 | 60 |
| Low molecular weight styrene-butadiene copolymer 2 | — | 60 | — | — | — | — | — | — |
| Low molecular weight styrene-butadiene copolymer 3 | — | — | — | — | 60 | — | — | — |
| Low molecular weight styrene-butadiene copolymer 4 | — | — | — | — | — | 60 | — | — |
| Carbon black | 60 | 60 | 60 | 60 | 60 | 60 | 60 | 60 |
| Resin 1 | 20 | 20 | — | 20 | 20 | 20 | — | — |
| Resin 2 | — | — | — | — | — | — | 20 | — |
| Resin 3 | — | — | — | — | — | — | — | 20 |
| Softening agent | 5 | 5 | 70 | 5 | 5 | 5 | 5 | 5 |
| Stearic acid | 2 | 2 | 2 | 2 | 2 | 2 | 2 | 2 |
| Zinc oxide 1 | 2 | 2 | 2 | 2 | 2 | 2 | 2 | 2 |
| Sulfur | 2 | 2 | 1.5 | 2 | 2 | 2 | 2 | 2 |
| Vulcanization accelerator 1 | 1.5 | 1.5 | 1.5 | 1.5 | 1.5 | 1.5 | 1.5 | 1.5 |
| Test results | | | | | | | | |
| Gripping performance | 106 | 108 | 100 | 95 | 104 | 98 | 108 | 96 |
| Abrasion resistance | 100 | 101 | 100 | 104 | 96 | 100 | 97 | 101 |

Hereinafter, the second embodiment of the present invention is explained in more detail based on Examples, but the present invention is not limited thereto.

(Synthesis of Copolymer)

Hereinafter, the process for synthesizing styrene-butadiene copolymers A-1 to A-3 and low molecular weight aromatic vinyl-conjugated butadiene copolymers B-0 to B-11 are shown. With respect to copolymers A-1 to A-3 and copolymers B-0 to B-11, the weight average molecular weight (Mw) was measured using a GPC-8000 series machine made by Tosoh Corporation and a differential refractometer as the detector and calibrated by standard polystyrene. The microstructure of the copolymers was found by measuring $^1$H-NMR at 25° C. using a JEOL JNM-A 400 NMR machine and determining the composition of the copolymers from the ratio of phenyl protons based on styrene units at 6.7 to 7.2 ppm and methylene protons of the vinyl bonds based on butadiene units at 4.7 to 5.2 ppm, calculated from the $^1$H-NMR spectrum. The hydrogenation ratio was calculated from methyl protons of the hydrogenated vinyl bonds at 0.6 to 1.0 ppm, methylene protons of the vinyl bonds that are not hydrogenated at 4.7 to 5.2 ppm and methine protons of the cis and trans structures and vinyl bonds that are not hydrogenated at 5.2 to 5.8 ppm. Furthermore, the epoxidization ratio was calculated by titrating a solution, which is obtained by adding a specific amount of the copolymer to a mixed solvent of brominated tetraethyl ammonium/acetic acid, with 1/10 N-perchloric acid/acetic acid.

(Synthesis of Styrene-Butadiene Copolymer A-1)

A nitrogen-replaced 2 liter autoclave equipped with a stirring blade was charged with 1000 g of cyclohexane, 20 g of tetrahydrofuran (THF), 80 g of 1,3-butadiene and 40 g of styrene and the temperature in the autoclave was adjusted to 25° C. Then, 0.05 g of n-butyl lithium was added and polymerization was conducted for 60 minutes while increasing the temperature. The conversion ratio of the monomers was confirmed to be 99%. Thereafter, 1.5 g of 2,6-di-t-butyl-p-cresol was added as the antioxidant. The results are shown in Table 3.

(Synthesis of Styrene-Butadiene Copolymers A-2 and A-3)

The copolymers were synthesized in the same manner as above, except that the ratio of the charged monomers and the amount of catalyst were changed. The results are shown in Table 3.

TABLE 3

| Copolymer | A-1 | A-2 | A-3 |
| --- | --- | --- | --- |
| Weight average molecular weight | 750000 | 1320000 | 880000 |
| Styrene content (% by weight) | 32 | 30 | 5 |
| Glass transition temperature (° C.) | −10 | −9 | −33 |
| Amount of vinyl bonds (%) | 44 | 48 | 47 |

(Synthesis of Low Molecular Weight Aromatic Vinyl-Conjugated Diene Copolymer B-0)

A nitrogen-replaced 2 liter autoclave equipped with a stirring blade was charged with 1000 g of cyclohexane, 20 g of tetrahydrofuran (THF), 150 g of 1,3-butadiene and 50 g of styrene and the temperature in the autoclave was adjusted to 25° C. Then, 2.0 g of n-butyl lithium was added and polymerization was conducted for 15 minutes while increasing the temperature. The conversion ratio of the monomers was confirmed to be 99%. Thereafter, 1.5 g of 2,6-di-t-butyl-p-cresol was added as the antioxidant. The results are shown in Table 4.

(Synthesis of Low Molecular Weight Aromatic Vinyl-Conjugated Diene Copolymer B-1)

A pressure resistance vessel was charged with 200 g of copolymer B-0, 300 g of THF and 10 g of 10% palladium carbon. After the inside of the vessel was replaced with nitrogen, the inside of the vessel was replaced with hydrogen so that the pressure became 5.0 kg/cm$^2$ and reaction was conducted at 80° C. The hydrogenation ratio was calculated from the spectrum decrease of unsaturated bonds in the 100

MHz proton NMR spectrum obtained by measuring a 15% by weight concentration copolymer B-1 using carbon tetrachloride as the solvent. The results are shown in Table 4.

(Synthesis of Copolymers B-2 to B-5)

The copolymers were synthesized in the same manner as above, except that the ratio of the charged monomers, the amount of catalyst and the hydrogen pressure were changed. The results are shown in Table 4.

TABLE 4

| | Copolymer | | | | | |
|---|---|---|---|---|---|---|
| | B-0 | B-1 | B-2 | B-3 | B-4 | B-5 |
| Weight average molecular weight | 10500 | 10700 | 9500 | 13000 | 11200 | 10600 |
| Styrene content (% by weight) | 25 | 25 | 45 | 5 | 25 | 25 |
| Amount of vinyl bonds (%) | 35 | — | — | — | — | — |
| Hydrogenation ratio (%) | — | 52 | 51 | 48 | 83 | 10 |

(Synthesis of Copolymer B-6)

A nitrogen-replaced 2 liter autoclave equipped with a stirring blade was charged with 1000 g of cyclohexane, 20 g of tetrahydrofuran (THF), 150 g of 1,3-butadiene and 50 g of styrene and the temperature in the autoclave was adjusted to 25° C. Then, 2.0 g of n-butyl lithium was added and polymerization was conducted for 15 minutes while increasing the temperature. The conversion ratio of the monomers was confirmed to be 99%. Thereafter, 1.5 g of 2,6-di-t-butyl-p-cresol was added as the antioxidant.

(Synthesis of Copolymer B-7)

In a pressure resistant vessel, 200 g of copolymer B-0 was dissolved in 300 g of toluene and 6.43 g of formic acid and 2 g of 2,6-di-t-butyl-p-cresol was added thereto. Then, 18.5 g of hydrogen peroxide adjusted to 45° C. was added and reaction was conducted while stirring for 3 hours. After the reaction was completed, the mixture was left to cool and neutralized by sodium hydroxide. Subsequently, after washing with water, toluene was removed under reduced pressure and the copolymer was collected.

(Synthesis of Copolymers B-8 to B-11)

The copolymers were synthesized in the same manner as B-7, except that the amounts of formic acid and hydrogen peroxide were changed. The results are shown in Table 5.

The property values of copolymers B-6 to B-11 obtained by the above synthesis methods are shown in Table 5. The weight average molecular weight (Mw), the styrene content and the amount of vinyl bonds were measured according to the methods described above.

TABLE 5

| | Copolymer | | | | | |
|---|---|---|---|---|---|---|
| | B-6 | B-7 | B-8 | B-9 | B-10 | B-11 |
| Weight average molecular weight | 11300 | 10700 | 9500 | 13000 | 11200 | 10600 |
| Styrene content (% by weight) | 24 | 25 | 45 | 5 | 25 | 25 |
| Amount of vinyl bonds (%) | 36 | — | — | — | — | — |
| Epoxidization ratio (%) | — | 15 | 18 | 12 | 68 | 1 |

EXAMPLES 3 TO 14 AND COMPARATIVE EXAMPLES 7 TO 21

The various chemicals used in Examples 3 to 14 and Comparative Examples 7 to 21 are described below.

Halogenide of copolymer of isobutylene and p-methylstyrene: Exxpro 90-10 available from Exxon Chemical Company Brominated butyl rubber: Bromobutyl 2255 available from Exxon Chemical Company Carbon black: SHOWBLACK N110 available from Showa Cabot Co. Ltd. ($N_2SA$: 143 $m^2/g$)

Silica: Ultrasil VN3 available from Degussa Co. ($N_2SA$: 210 $m^2/g$)

Silane coupling agent: Si69 available from Degussa Co.

Softening agent: Diana Process Oil AH-16 available from Idemitsu Kosan Co., Ltd.

Stearic acid: Stearic acid available from NOF Corporation

Zinc oxide 2: Zinc Oxide type 1 available from Mitsui Mining and Smelting Co., Ltd.

Zinc oxide 3: Zinc Oxide type 2 available from Mitsui Mining and Smelting Co., Ltd.

Antioxidant: NOCRAC 6C available from Ouchi Shinko Chemical Industrial Co., Ltd.

Sulfur: powdery sulfur available from Tsurumi Chemicals Co., Ltd.

Vulcanization accelerator 1: Nocceler CZ available from Ouchi Shinko Chemical Industrial Co., Ltd.

Vulcanization accelerator 2: Nocceler NS available from Ouchi Shinko Chemical Industrial Co., Ltd.

Vulcanization accelerator 3: Nocceler D available from Ouchi Shinko Chemical Industrial Co., Ltd.

The chemicals were kneaded according to the compositions shown in Tables 6 to 8. The obtained compositions were press vulcanized at 170° C. for 20 minutes to obtain vulcanized articles and the following test of properties of the articles were conducted.

Evaluation of the vulcanized rubber is described below.

(Gripping Performance)

A tire having a tread comprising the above rubber composition was prepared. A car on which the tire was mounted was driven on an asphalt road surface test course. The stability of steering control was evaluated by the test driver and the evaluation was represented as an index, assuming the evaluation of Comparative Example 7 to be 100. The larger the value is the higher and more excellent the gripping performance.

(Wet Grip Performance)

The car on which the above tire was mounted was driven on an asphalt road surface test course, which was wetted by a sprinkler truck. The stability of steering control was evaluated by the test driver and the evaluation was represented as an index, assuming the evaluation of Comparative Examples 12 and 17 to be 100. The larger the value is the higher and more excellent the wet grip performance.

(Abrasion Test)

The car on which the above tire was mounted was run for 20 laps on the test course. The depths of the grooves before and after running were measured and the depth was represented as an index, assuming the depth of Comparative Examples 7, 12 and 17 to be 100. The larger the value is the higher and more excellent the abrasion resistance.

(Bleeding Resistance)

The surface of the tire was observed and the degree of bleeding of oily substances was visually evaluated.

○: no bleeding
Δ: some bleeding
x: significant bleeding

The evaluation results are shown in Tables 6 to 8.

TABLE 6

|  | Ex. | | | Com. Ex. | | | | |
| --- | --- | --- | --- | --- | --- | --- | --- | --- |
|  | 3 | 4 | 5 | 7 | 8 | 9 | 10 | 11 |
| Composition (parts by weight) | | | | | | | | |
| Copolymer A-1 | 100 | 100 | — | 100 | 100 | 100 | 100 | — |
| Copolymer A-2 | — | — | 100 | — | — | — | — | — |
| Copolymer A-3 | — | — | — | — | — | — | — | 100 |
| Copolymer B-0 | — | — | — | 60 | — | — | — | — |
| Copolymer B-1 | 60 | — | 60 | — | — | — | — | 60 |
| Copolymer B-2 | — | 60 | — | — | — | — | — | — |
| Copolymer B-3 | — | — | — | — | 60 | — | — | — |
| Copolymer B-4 | — | — | — | — | — | 60 | — | — |
| Copolymer B-5 | — | — | — | — | — | — | 60 | — |

TABLE 6-continued

|  | Ex. | | | Com. Ex. | | | | |
| --- | --- | --- | --- | --- | --- | --- | --- | --- |
|  | 3 | 4 | 5 | 7 | 8 | 9 | 10 | 11 |
| Carbon black | 80 | 80 | 80 | 80 | 80 | 80 | 80 | 80 |
| Softening agent | 20 | 20 | — | 20 | 20 | 20 | 20 | 20 |
| Stearic acid | 2 | 2 | 2 | 2 | 2 | 2 | 2 | 2 |
| Zinc oxide 2 | 3 | 3 | 3 | 3 | 3 | 3 | 3 | 3 |
| Antioxidant | 1 | 1 | 1 | 1 | 1 | 1 | 1 | 1 |
| Sulfur | 1.5 | 1.5 | 1.5 | 1.5 | 1.5 | 1.5 | 1.5 | 1.5 |
| Vulcanization accelerator 1 | 1.5 | 1.5 | 1.5 | 1.5 | 1.5 | 1.5 | 1.5 | 1.5 |
| Test results | | | | | | | | |
| Gripping performance | 117 | 121 | 109 | 100 | 109 | 123 | 100 | 100 |
| Abrasion resistance | 119 | 113 | 124 | 100 | 124 | 118 | 100 | 122 |
| Bleeding resistance | ○ | ○ | ○ | ○ | Δ | X | ○ | Δ |

TABLE 7

|  | Ex. | | | | | Com. Ex. | | | | |
| --- | --- | --- | --- | --- | --- | --- | --- | --- | --- | --- |
|  | 6 | 7 | 8 | 9 | 10 | 12 | 13 | 14 | 15 | 16 |
| Composition (parts by weight) | | | | | | | | | | |
| Exxpro 90-10 | 50 | 50 | 50 | — | 50 | 50 | 50 | 50 | 50 | 50 |
| Bromobutyl 2255 | — | — | — | 50 | — | — | — | — | — | — |
| Copolymer A-1 | 50 | 50 | — | 50 | 50 | 50 | 50 | 50 | 50 | — |
| Copolymer A-2 | — | — | 50 | — | — | — | — | — | — | — |
| Copolymer A-3 | — | — | — | — | — | — | — | — | — | 50 |
| Copolymer B-0 | — | — | — | — | — | 40 | — | — | — | — |
| Copolymer B-1 | 40 | — | 40 | 40 | 80 | — | — | — | — | 40 |
| Copolymer B-2 | — | 40 | — | — | — | — | — | — | — | — |
| Copolymer B-3 | — | — | — | — | — | — | 40 | — | — | — |
| Copolymer B-4 | — | — | — | — | — | — | — | 40 | — | — |
| Copolymer B-5 | — | — | — | — | — | — | — | — | 40 | — |
| Silica | 80 | 80 | 80 | 80 | 80 | 80 | 80 | 80 | 80 | 80 |
| Softening agent | 50 | 50 | 50 | 50 | 50 | 50 | 50 | 50 | 50 | 50 |
| Silane coupling agent | 8 | 8 | 8 | 8 | 8 | 8 | 8 | 8 | 8 | 8 |
| Carbon black | 5 | 5 | 5 | 5 | 5 | 5 | 5 | 5 | 5 | 5 |
| Stearic acid | 2 | 2 | 2 | 2 | 2 | 2 | 2 | 2 | 2 | 2 |
| Zinc oxide 3 | 3 | 3 | 3 | 3 | 3 | 3 | 3 | 3 | 3 | 3 |
| Sulfur | 1.5 | 1.5 | 1.5 | 1.5 | 1.5 | 1.5 | 1.5 | 1.5 | 1.5 | 1.5 |
| Vulcanization accelerator 2 | 2.0 | 2.0 | 2.0 | 2.0 | 2.0 | 2.0 | 2.0 | 2.0 | 2.0 | 2.0 |
| Vulcanization accelerator 3 | 0.5 | 0.5 | 0.5 | 0.5 | 0.5 | 0.5 | 0.5 | 0.5 | 0.5 | 0.5 |
| Test results | | | | | | | | | | |
| Wet grip performance | 119 | 121 | 115 | 117 | 116 | 100 | 113 | 124 | 100 | 100 |
| Abrasion resistance | 116 | 108 | 118 | 112 | 103 | 100 | 115 | 111 | 100 | 115 |
| Bleeding resistance | ○ | ○ | ○ | ○ | ○ | ○ | Δ | X | ○ | Δ |

TABLE 8

|  | Ex. | | | | Com. Ex. | | | | |
| --- | --- | --- | --- | --- | --- | --- | --- | --- | --- |
|  | 11 | 12 | 13 | 14 | 17 | 18 | 19 | 20 | 21 |
| Composition (parts by weight) | | | | | | | | | |
| Exxpro 90-10 | 50 | 50 | 50 | — | 50 | 50 | 50 | 50 | 50 |
| Copolymer A-1 | 50 | 50 | — | 100 | 50 | 50 | 50 | 50 | — |
| Copolymer A-2 | — | — | 50 | — | — | — | — | — | — |
| Copolymer A-3 | — | — | — | — | — | — | — | — | 50 |
| Copolymer B-6 | — | — | — | — | 40 | — | — | — | — |
| Copolymer B-7 | 40 | — | 40 | 40 | — | — | — | — | 40 |
| Copolymer B-8 | — | 40 | — | — | — | — | — | — | — |
| Copolymer B-9 | — | — | — | — | — | 40 | — | — | — |
| Copolymer B-10 | — | — | — | — | — | — | 40 | — | — |
| Copolymer B-11 | — | — | — | — | — | — | — | 40 | — |
| Carbon black | 5 | 5 | 5 | 5 | 5 | 5 | 5 | 5 | 5 |
| Silica | 80 | 80 | 80 | 80 | 80 | 80 | 80 | 80 | 80 |
| Silane coupling agent | 8 | 8 | 8 | 8 | 8 | 8 | 8 | 8 | 8 |
| Softening agent | 50 | 50 | 30 | 60 | 50 | 50 | 50 | 50 | 50 |
| Stearic acid | 2 | 2 | 2 | 2 | 2 | 2 | 2 | 2 | 2 |
| Zinc oxide 3 | 3 | 3 | 3 | 3 | 3 | 3 | 3 | 3 | 3 |
| Sulfur | 1.5 | 1.5 | 1.5 | 1.5 | 1.5 | 1.5 | 1.5 | 1.5 | 1.5 |
| Vulcanization accelerator 2 | 2.0 | 2.0 | 2.0 | 2.0 | 2.0 | 2.0 | 2.0 | 2.0 | 2.0 |
| Vulcanization accelerator 3 | 0.5 | 0.5 | 0.5 | 0.5 | 0.5 | 0.5 | 0.5 | 0.5 | 0.5 |
| Test results | | | | | | | | | |
| Wet grip performance | 115 | 118 | 110 | 103 | 100 | 92 | 97 | 99 | 95 |
| Abrasion resistance | 120 | 116 | 128 | 132 | 100 | 100 | 92 | 100 | 104 |

Hereinafter, the third embodiment of the present invention is explained in more detail based on Examples, but the present invention is not limited thereto.

PREPARATION EXAMPLE 5 TO 7

(Synthesis of Olefin-Conjugated Diene-Aromatic Vinyl Copolymer)

A nitrogen-replaced 50 mL vessel was charged with 15 mL of toluene, 4 mL of a toluene solution of cyclopentadienyl triphenoxy titanium and methyl aluminoxane (MAO) ([Al]/[Ti]=500, [Al]=3.4 mol/L), 4 mL of styrene and 4 mL of butadiene. While stirring at 70° C., ethylene was added so that the partial pressure becomes 1.2 kg/cm² and polymerization was conducted for 1 hour. Thereafter, the reaction was suspended by adding a methanol-hydrochloric acid (2%) solution to obtain olefin-conjugated diene-aromatic vinyl copolymer 5.

Copolymers 6 and 7 were synthesized by the same method except that the amounts that were added, the reaction temperature and the reaction time were changed.

(Structural Formula of Copolymers 5 TO 7)

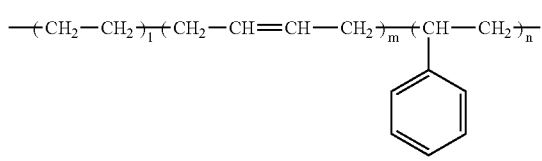

PREPARATION EXAMPLE 8

A nitrogen-replaced 50 mL vessel was charged with 15 mL of cyclohexane, 2 mL of 1,3-butadiene, 1 mL of styrene and 0.5 mL of tetrahydrofuran. After 0.3 mmol of n-butyl lithium was added thereto, polymerization was conducted for 5 minutes at 40° C. and then, methanol was added to suspend the reaction.

(Weight Average Molecular Weight)

The weight average molecular weight (Mw) was measured using a GPC-8000 series machine made by Tosoh Corporation and a differential refractometer as the detector and calibrated by standard polystyrene.

(Monomer Unit Ratio)

$^1$H-NMR was measured at 25° C. using a JEOL JNM-A 400 NMR machine. From

Signal A: protons (—$C_6H_5$) of the benzene ring of the styrene part at δ 6.5 to 7.5 ppm, Signal B: methine protons (—CH=) of the butadiene part at δ 5.2 to 5.8 ppm, Signal C: methylene protons by a 1,2 bond (=$CH_2$) of the butadiene part at δ 4.7 to 5.2 ppm, Signal D: single bond methylene protons (—$CH_2$—) and methine protons (—CH—) at δ 0.5 to 3.0 ppm, the monomer unit ratio was found from the following equation.

[ethylene]:[butadiene]:[styrene]={−3[A]/5−2[B]−2[C]+[D]}/4:[B]/2+[C]/2: [A]/5

The various chemicals used in Examples 15 to 17 and Comparative Examples 22 to 23 are described below.

SBR: TUFDENE 3330 available from Asahi Chemical Industry Co., Ltd. (Tg: −43° C.)

Carbon black: SHOWBLACK N110 available from Showa Cabot Co. Ltd. ($N_2SA$: 143 $m^2/g$)

Olefin-conjugated diene-aromatic vinyl copolymer 5: weight average molecular weight Mw=2500, molecular weight distribution (Mw/Mn)=1.34, [ethylene]:[butadiene]:[styrene]=21:65:14

Olefin-conjugated diene-aromatic vinyl copolymer 6: weight average molecular weight Mw=5000, molecular weight distribution (Mw/Mn)=1.42, [ethylene]:[butadiene]:[styrene]=20:67:13

Olefin-conjugated diene-aromatic vinyl copolymer 7: weight average molecular weight Mw=500, molecular weight distribution (Mw/Mn)=1.25, [ethylene]:[butadiene]:[styrene]=18:68:14

Styrene-butadiene copolymer: weight average molecular weight Mw=2500, [butadiene]:[styrene]=85:15

Softening agent: Diana Process Oil AH-16 available from Idemitsu Kosan Co., Ltd.

Stearic acid: Stearic acid available from NOF Corporation

Zinc oxide 1: Zinc Oxide type 1 available from Mitsui Mining and Smelting Co., Ltd.

Sulfur: powdery sulfur available from Tsurumi Chemicals Co., Ltd.

Vulcanization accelerator 1: Nocceler CZ available from Ouchi Shinko Chemical Industrial Co., Ltd.

EXAMPLES 15 TO 17 AND COMPARATIVE EXAMPLES 22 TO 23

The chemicals were kneaded and mixed according to the compositions shown in Table 9 to obtain each sample rubber composition. The obtained compositions were press vulcanized at 170° C. for 20 minutes to obtain vulcanized articles and the following test of properties of the articles were conducted.

(Gripping Performance)

A tire having a tread comprising the above rubber composition was prepared. The tire was driven on an asphalt road surface test course. The stability of steering control was evaluated by the test driver and the evaluation was represented as an index, assuming the evaluation of Comparative Example 22 to be 100. The larger the value is the higher the gripping performance.

(Abrasion Test)

The above tire was run for 20 laps on the test course. The depths of the grooves before and after running were measured and the depth was represented as an index, assuming the depth of Comparative Examples 22 to be 100. The larger the value is the better the abrasion resistance.

The test results are shown in Table 9.

TABLE 9

|  | Ex. | | | Com. Ex. | |
| --- | --- | --- | --- | --- | --- |
|  | 15 | 16 | 17 | 22 | 23 |
| Composition (parts by weight) | | | | | |
| SBR | 100 | 100 | 100 | 100 | 100 |
| Carbon black | — | — | — | 70 | 70 |
| Softening agent | — | — | — | 30 | — |
| Styrene-butadiene copolymer | — | — | — | — | 30 |
| Olefin-conjugated diene-aromatic vinyl copolymer 5 | 30 | — | — | — | — |

TABLE 9-continued

|  | Ex. | | | Com. Ex. | |
| --- | --- | --- | --- | --- | --- |
|  | 15 | 16 | 17 | 22 | 23 |
| Olefin-conjugated diene-aromatic vinyl copolymer 6 | — | 30 | — | — | — |
| Olefin-conjugated diene-aromatic vinyl copolymer 7 | — | — | 30 | — | — |
| Stearic acid | 2 | 2 | 2 | 2 | 2 |
| Zinc oxide 1 | 2 | 2 | 2 | 2 | 2 |
| Sulfur | 1.5 | 1.5 | 1.5 | 1.5 | 1.5 |
| Vulcanization accelerator 1 | 1.5 | 1.5 | 1.5 | 1.5 | 1.5 |
| Test results | | | | | |
| Gripping performance | 109 | 106 | 111 | 100 | 110 |
| Abrasion resistance | 102 | 104 | 99 | 100 | 94 |

According to the first embodiment of the present invention, by compounding a specific low molecular weight aromatic vinyl-conjugated diene copolymer, a specific resin and a small amount of a softening agent and/or a plasticizer to a rubber component containing an aromatic vinyl-conjugated diene copolymer having a specific microstructure, a rubber composition for a tire, in which abrasion resistance and gripping performance are highly improved in a balanced manner, and a tire using the composition can be provided.

Also, according to the second embodiment of the present invention, by compounding a hydrogenated low molecular weight aromatic vinyl-conjugated diene copolymer having a specific hydrogenation ratio to a rubber component containing an aromatic vinyl-conjugated diene copolymer having a specific microstructure, a rubber composition for a tire, in which abrasion resistance and gripping performance are highly improved in a balanced manner and bleeding is suppressed, and a tire using the composition can be provided.

Furthermore, according to the third embodiment of the present invention, by compounding an olefin-conjugated diene-aromatic vinyl copolymer, a rubber composition for a tire, in which abrasion resistance and gripping performance are highly improved in a balanced manner, and a tire using the composition can be provided.

What is claimed is:

1. A rubber composition for a tire comprising 5 to 200 parts by weight of a low molecular weight aromatic vinyl-conjugated diene copolymer (B) based on 100 parts by weight of a rubber component, other than the low molecular weight aromatic vinyl-conjugated diene copolymer, containing an aromatic vinyl-conjugated diene copolymer (A);

wherein said aromatic vinyl-conjugated diene copolymer (A) has weight average molecular weight of $5.0 \times 10^5$ to $2.5 \times 10^6$ and aromatic vinyl content of 10 to 60% by weight; and said low molecular weight aromatic vinyl-conjugated diene copolymer (B) has weight average molecular weight of $1.0 \times 10^3$ to $1.0 \times 10^5$ and has an aromatic vinyl content of 10 to 75 % by weight, and is obtained by hydrogenating or epoxidizing a low molecular weight aromatic vinyl-conjugated diene copolymer, in which the amount of vinyl bonds in the conjugated diene part of copolymer (B) is 20 to 70%, and copolymer (B) has an hydrogenation ratio in the conjugated diene part of 20 to 55% or an epoxidization ratio of 3 to 60%.

2. The rubber composition for a tire of claim 1, which further comprises halogenated butyl rubber or a halogenide of a copolymer of isobutylene and p-methylstyrene as a rubber component.

3. The rubber composition for a tire of claim 1, wherein the amount of vinyl bonds in the conjugated diene part of said aromatic vinyl-conjugated diene copolymer (A) is 15 to 70%.

4. The rubber composition for a tire of claim 1, wherein the aromatic vinyl content of said aromatic vinyl-conjugated diene copolymer (A) and the aromatic vinyl content of said low molecular weight aromatic vinyl-conjugated diene copolymer (B) satisfy the following equation: aromatic vinyl content of copolymer (B)> aromatic vinyl content of copolymer (A).

5. A rubber composition for a tire comprising 5 to 200 parts by weight of an olefin-conjugated diene-aromatic vinyl copolymer based on 100 parts by weight of a diene rubber component other than the olefin-conjugated diene-aromatic vinyl copolymer.

6. The rubber composition for a tire of claim 5, wherein the weight average molecular weight of said olefin-conjugated diene-aromatic vinyl copolymer is 2,000 to 50,000.

7. A tire comprising tread and body components, wherein one or both components are formed from the rubber composition for a tire of claim 1.

8. A tire comprising tread and body components, wherein one or both components are formed from the rubber composition for a tire of claim 5.

9. The rubber composition for a tire of claim 5, wherein the olefin-conjugated diene-aromatic vinyl copolymer contains olefin monomer units in a ratio of at least 5% by weight, conjugated diene monomer units in a ratio of at least 5% by weight, and aromatic vinyl monomer units in a ratio of at least 5% by weight.

10. The rubber composition for a tire of claim 5, wherein the olefin-conjugated diene-aromatic vinyl copolymer contains olefin monomer units in a ratio of at least 10% by weight, conjugated diene monomer units in a ratio of at least 10% by weight, and aromatic vinyl monomer units in a ratio of at least 10% by weight.

11. The rubber composition for a tire of claim 2, wherein the hydrogenation ratio is 30 to 50%.

* * * * *